(12) United States Patent
Park et al.

(10) Patent No.: US 8,474,005 B2
(45) Date of Patent: Jun. 25, 2013

(54) METHOD OF EXECUTING VIRTUALIZED APPLICATION ABLE TO RUN IN VIRTUALIZED ENVIRONMENT

(75) Inventors: Jae-min Park, Seoul (KR); Sang-bum Suh, Seoul (KR); Kyung-ah Chang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 520 days.

(21) Appl. No.: 12/318,814

(22) Filed: Jan. 8, 2009

(65) Prior Publication Data
US 2010/0031311 A1    Feb. 4, 2010

(30) Foreign Application Priority Data
Jul. 30, 2008    (KR) .................. 10-2008-0074793

(51) Int. Cl.
*H04L 29/06*    (2006.01)
(52) U.S. Cl.
USPC ........................................................... 726/1
(58) Field of Classification Search
USPC ................. 726/1, 2, 26, 27, 5; 380/201
See application file for complete search history.

(56) References Cited

U.S. PATENT DOCUMENTS

| | | | |
|---|---|---|---|
| 5,661,800 A * | 8/1997 | Nakashima et al. | 726/27 |
| 5,745,879 A | 4/1998 | Wyman | |
| 5,968,175 A * | 10/1999 | Morishita et al. | 726/28 |
| 7,225,461 B2 * | 5/2007 | Oshima et al. | 726/3 |
| 7,418,457 B2 * | 8/2008 | Kaler et al. | 1/1 |
| 2005/0204126 A1 | 9/2005 | Watson | |
| 2008/0098391 A1 | 4/2008 | Medvedev et al. | |
| 2008/0098465 A1 * | 4/2008 | Ramakrishna et al. | 726/5 |
| 2008/0178299 A1 | 7/2008 | Merkle et al. | |
| 2009/0199178 A1 * | 8/2009 | Keller et al. | 718/1 |
| 2009/0249329 A1 * | 10/2009 | Dash | 718/1 |
| 2009/0328225 A1 * | 12/2009 | Chambers et al. | 726/26 |

OTHER PUBLICATIONS

PCT Written Opinion and Search Report issued Aug. 6, 2009 in corresponding Korean Patent Application No. 2008-007470.
Extended European Search Report dated Jan. 23, 2013 in corresponding European Patent Application No. 08876671.2.

* cited by examiner

*Primary Examiner* — Ali Abyaneh
(74) *Attorney, Agent, or Firm* — Staas & Halsey LLP

(57) ABSTRACT

A method of executing a virtualized application able to run in a virtualized environment. The virtualized application includes application software and the virtualized environment. The application software includes a license monitor to search for a software license while monitoring an execution policy set by a software provider when software is installed or executed. The virtualized environment includes an environment monitor to monitor an execution environment provided to the application software by the virtualized environment. Therefore, it is possible to prevent software able to run in a virtualized environment from being freely copied without any limitations by the execution policy provided by the software provider.

17 Claims, 7 Drawing Sheets

METHOD OF EXECUTING VIRTUALIZED APPLICATION ABLE TO RUN IN VIRTUALIZED ENVIRONMENT

CROSS-REFERENCE TO RELATED APPLICATIONS

This application claims the benefit of Korean Application No. 2008-0074793, filed Jul. 30, 2008, in the Korean Intellectual Property Office, the disclosure of which is incorporated herein by reference.

BACKGROUND

1. Field

Aspects of embodiments of the present invention relate to a method of executing a virtualized application able to run in a virtualized environment, and more particularly, to a method of executing a virtualized application, which is able to be integrated with a virtualized environment and able to run in the virtualized environment so that it is possible to perform authentication.

2. Description of the Related Art

Recently, virtualization technologies using virtual machines have become more widespread. Virtualization technologies are mainly used to efficiently use resources. For example, virtualization technologies enable a single computing system or a single server system to include a plurality of operating systems (OS).

Such virtualization technologies include system virtualization, OS virtualization and application virtualization.

Among these, application virtualization enables general applications to run in the virtualized environment. Conventionally, it has been possible for a user to launch an application able to run in the virtualized environment in an external computing environment using an external hard disk drive (HDD), but in this situation, the application generally does not directly interface with the external computing environment. In other words, the application is only able to interface with the external computing environment through the virtualized environment.

Accordingly, it is impossible for the application itself to recognize changes in the external computing environment, and thus the application may be used in all computing environments without any limitation to the type of computing environment. As a result, when such a conventional application able to run in the virtualized environment is used, it is impossible to prevent the application or virtualized environment from being illegally copied.

SUMMARY

Aspects of embodiments of the present invention relate to a method of executing a virtualized application able to run in a virtualized environment wherein it is possible to determine whether an execution policy pre-stored in the virtualized environment, and applied when the virtualized application is installed, conforms with an actual execution policy applied to an actual execution environment.

According to an embodiment of the present invention, there is provided a method of executing a virtualized application able to run in a virtualized environment, the method including using a computer to perform the steps of searching for a license pre-stored in the virtualized application, upon an occurrence of an event to launch the virtualized application, monitoring a system environment and determining whether license for the system environment conforms with the pre-stored license, and launching the virtualized application according to an execution policy of the virtualized application, upon determining that the license for the system environment conforms with the pre-stored license.

According to an aspect of embodiments of the present invention, each of the two licenses may be a precondition required to perform the execution policy of the virtualized application.

According to an aspect of embodiments of the present invention, the execution policy of the virtualized application may be updated by an external server.

According to an aspect of embodiments of the present invention, the method may further include installing the virtualized application.

According to an aspect of embodiments of the present invention, the virtualized environment may be an environment in which conditions required for installing the virtualized application in the system environment are set virtually.

According to an aspect of embodiments of the present invention, each of the two licenses may be one selected from the group including an identification (ID), an execution period, the number of times of execution, the type and version of operating system (OS), and an execution environment.

According to an embodiment of the present invention, there is provided a method of executing a virtualized application able to run in a virtualized environment, the method including using a computer to perform the steps of receiving an updated execution policy, determining whether a license for a system environment conforms with a license pre-stored in the virtualized application, and launching the virtualized application according to the updated execution policy, upon determining that the license for the system environment conforms with the pre-stored license.

According to an aspect of embodiments of the present invention, the receiving may include transmitting one of a plurality of execution policies pre-stored in the virtualized environment to an external server, determining whether the transmitted execution policy is up-to-date, and receiving the updated execution policy from the external server so as to be up-to-date, upon determining that the transmitted execution policy is not up-to-date.

According to an aspect of embodiments of the present invention, the receiving may include receiving the last updated execution policy among the plurality of execution policies pre-stored in the virtualized environment.

According to an embodiment of the present invention, there is provided a computer-readable recording medium having a program causing a computer to perform a method of executing a virtualized application able to run in a virtualized environment. The method may include searching for a license pre-stored in the virtualized application, upon the occurrence of an event to launch the virtualized application, monitoring a system environment and determining whether a license for the system environment conforms with the pre-stored license, and launching the virtualized application according to an execution policy of the virtualized application, upon determining that the license for the system environment conforms with the pre-stored license.

According to an aspect of embodiments of the present invention, each of the two licenses may be a precondition required to perform the execution policy of the virtualized application.

According to an aspect of embodiments of the present invention, the method may further include installing the virtualized application.

According to an embodiment of the present invention, there is provided a computer-readable recording medium having a program causing a computer to perform a method of executing a virtualized application able to run in a virtualized environment. The method may include receiving an updated execution policy, determining whether a license for a system environment conforms with a license pre-stored in the virtualized application, and launching the virtualized application according to the updated execution policy, upon determining that the license for the system environment conforms with the pre-stored license.

According to an aspect of embodiments of the present invention, the receiving may include transmitting one of a plurality of execution policies pre-stored in the virtualized environment to an external server, determining whether the transmitted execution policy is up-to-date, and receiving the updated execution policy from the external server so as to be up-to-date, upon determining that the transmitted execution policy is not up-to-date.

According to an aspect of embodiments of the present invention, the receiving may include receiving the last updated execution policy among the plurality of execution policies pre-stored in the virtualized environment.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
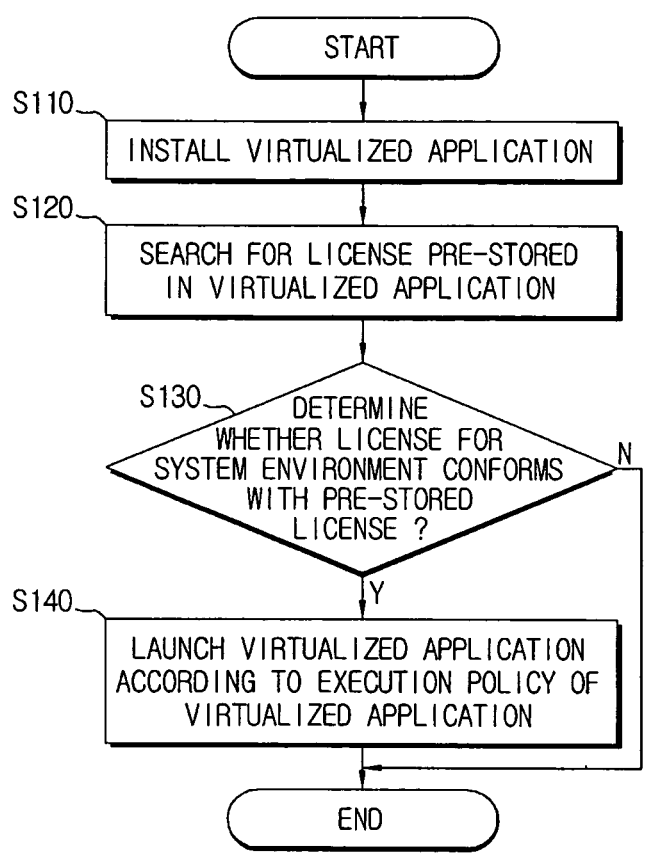
FIG. 1 illustrates a flowchart of a method of executing a virtualized application able to run in a virtualized environment according to an exemplary embodiment of the present invention.

Reference will now be made in detail to embodiments of the present invention, examples of which are illustrated in the accompanying drawings, wherein like reference numerals refer to like elements throughout. The embodiments are described below in order to explain the aspects of embodiments of the present invention by referring to the figures.

FIG. 1 illustrates a flowchart of a method of executing a virtualized application able to run in a virtualized environment according to an exemplary embodiment of the present invention. The method shown in FIG. 1 includes installing the virtualized application (S110), searching for a license pre-stored in the virtualized application (S120), determining whether a license for a system environment conforms with the pre-stored license while monitoring the system environment (S130), and launching the virtualized application according to an execution policy of the virtualized application (S140) if it is determined that the license for the system environment conforms with the pre-stored license (S130-Y). If it is determined that the license for the system environment does not conform with the pre-stored license, then the method ends (S130-N). The method of executing the virtualized application will be described in detail with reference to FIGS. 2 and 3.

Figure 2:
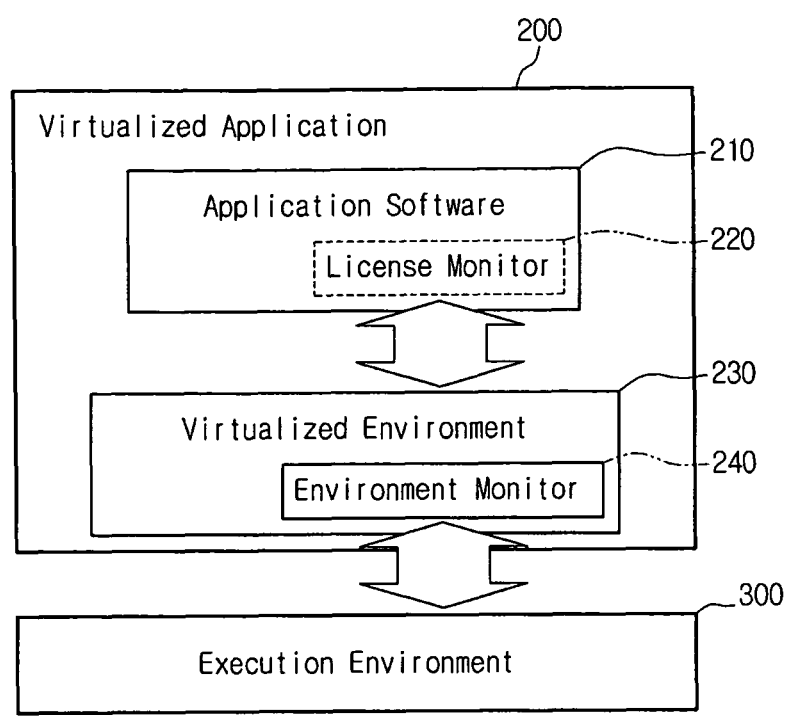
FIG. 2 illustrates a block diagram of a virtualized application able to run in a virtualized environment according to an exemplary embodiment of the present invention.

FIG. 2 illustrates a block diagram of a virtualized application 200 able to run in a virtualized environment 230 according to an exemplary embodiment of the present invention. In FIG. 2, the virtualized application 200 includes application software 210 and the virtualized environment 230.

The application software 210 may be a commonly used application program such as MS Word. In an embodiment of the present invention, the application software 210 may be launched according to an execution policy or use policy required by an application software provider. Here, the execution policy may restrict execution of the application software 210, for example the execution policy may enable the application software 210 to operate only with a certain central processing unit (CPU) or a certain operating system (OS).

The application software 210 may be integrated with the virtualized environment 230, so it is possible for the virtualized environment 230 to virtually provide an environment in which the application software 210 is able to run. The virtualized environment 230 refers to an environment in which conditions required for installing the application software 210 in a system environment, namely an execution environment 300, are set virtually.

Accordingly, the virtualized application 200 may be executed in the virtualized environment 230 regardless of the actual execution environment 300. Therefore, it is possible to launch the virtualized application 200 in various computing systems without a need for re-installation whenever the execution environment 300 changes, and it is thus possible to increase the mobility of the application software 210.

The application software 210 may include a license monitor 220. The license monitor 220 searches for a software license while monitoring an execution policy set by a software provider when software is installed or executed.

For example, if a software provider sets an execution policy stating that 'The application software 210 may be executed only when using a certain CPU', a unique identification (ID) number (or a serial number) of the CPU may be used as a license for the application software 210. The license for the application software 210 refers to a precondition required to determine whether the execution environment 300 satisfies conditions for executing the application software 210, so the execution policy may contain the license for the application software 210.

The virtualized environment 230 may include an environment monitor 240. The environment monitor 240 monitors the execution environment 300 provided to the application software 210 by the virtualized environment 230.

Additionally, the virtualized application 200 may be executed in various execution environments. For example, the execution environment 300 outside the virtualized application 200 may directly provide resources required when the application software 210 is executed, or may indirectly provide resources required when the application software 210 is mapped onto the virtualized environment 230.

Figure 3:
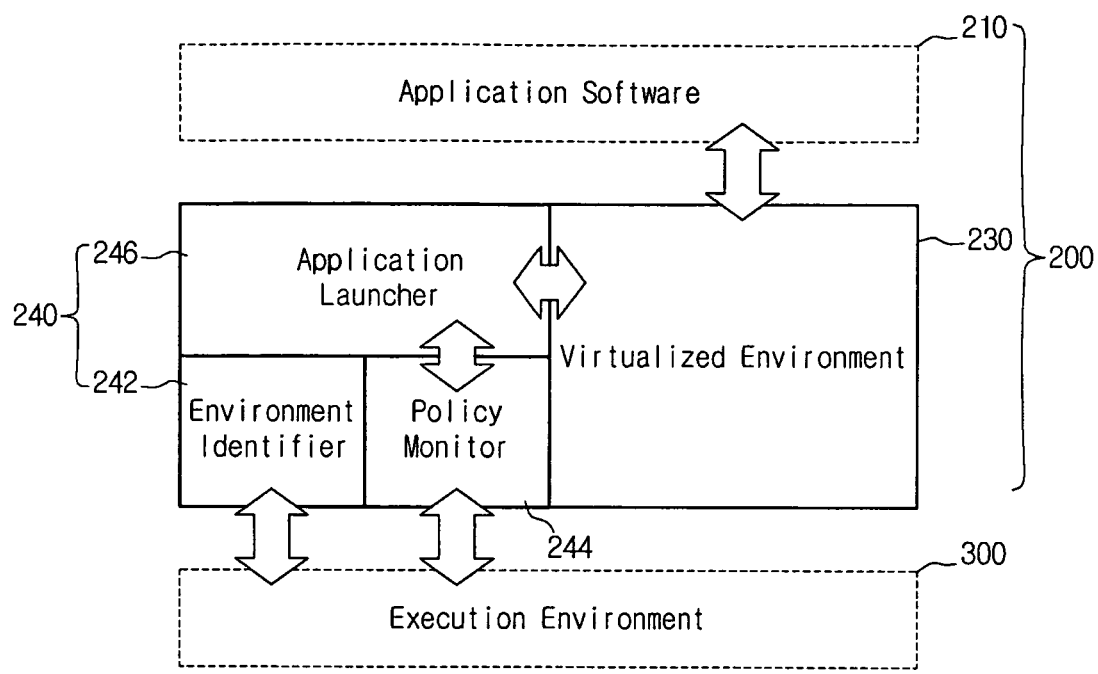
FIG. 3 illustrates a detailed block diagram of the virtualized application shown in FIG. 2, for example.

FIG. 3 illustrates a detailed block diagram of the virtualized application 200 shown in FIG. 2. The virtualized application 200 shown in FIG. 3 is configured in the same manner as the virtualized application 200 shown in FIG. 2, except that the environment monitor 240 of the virtualized environment 230 shown in FIG. 3 includes an environment identifier 242, a policy monitor 244 and an application launcher 246.

The environment identifier 242 receives information on a license found as a result of searching from the execution environment 300.

The policy monitor 244 receives an execution policy of the execution environment 300 while monitoring the execution environment 300. The execution policy of the execution environment 300 may be updated by an external policy server (not shown). Additionally, when a license is received by the environment identifier 242 from the execution environment 300, the policy monitor 244 determines whether the license received from the execution environment 300 via the policy monitor 244 conforms with a license for an execution policy pre-stored in the virtualized environment 230.

When it is determined that the license received from the execution environment 300 conforms with the license for the execution policy pre-stored in the virtualized environment 230, the application launcher 246 launches the virtualized application 200 according to the execution policy of the application software 210 pre-stored in the virtualized environment 230.

The method of executing the virtualized application 200 able to run in the virtualized environment will be described in detail with reference to FIGS. 1, 2 and 3.

The virtualized application 200 is installed in operation S110. For example, a user may install the virtualized application 200 using a desktop personal computer (PC) in his or her home.

After installing the virtualized application 200, the virtualized application 200 may be connected to a user's notebook, a desktop PC in a company or a desktop PC in a school via a mobile device providing storage space. Here, the mobile device providing storage space may include various consumer electronics providing storage space, for example an external hard drive, a user serial bus (USB) flash memory, a personal digital assistant (PDA) or a portable media player (PMP). Accordingly, the mobile device enables the mobility of the virtualized application 200 to increase so that the virtualized application 200 may be launched regardless of changes in the execution environment 300. In this situation, the execution environment 300 may be referred to as a system environment or platform.

If an event to launch the virtualized application 200 occurs after an external hard drive in which the virtualized application 200 is stored is connected to an external computing system, a search for a license pre-stored in the virtualized application 200 is performed in operation S120. For example, if a user double clicks on an execution file of the virtualized application 200 on a display screen of an external computing system, an operation may launch the virtualized application 200.

Accordingly, the license monitor 220 may search for a license required to execute the virtualized application 200 according to the execution policy while monitoring the execution policy.

For example, if an execution policy stating that 'The application software 210 may be used from Jan. 25, 2007, to Jan. 25, 2008' is set, the phrase 'from Jan. 25, 2007, to Jan. 25, 2008' may be a license. In this situation, the license may take various forms according to the type of execution policy. For example, the license may include a unique ID (or a serial number), an execution period, the number of times of execution (for example, a situation in which an execution policy regarding the volume copy is applied), the type and version of the OS (for example, Windows Vista or certain versions of Windows Vista), or a certain execution environment (for example, a situation in which a random-access memory (RAM) or a CPU is fabricated by a certain manufacturer).

After the search in operation S120, whether the license for the system environment conforms with the license pre-stored in the virtualized application 200 may be determined while the system environment is being monitored in operation S130.

Specifically, if the license is received by the environment identifier 242, the policy monitor 244 determines whether the license received from the execution environment 300 conforms with the license for the execution policy pre-stored in the virtualized environment 230 in operation S130.

If it is determined that the license for the system environment, namely the execution environment 300, conforms with the license pre-stored in the virtualized application 200 in operation S130-Y, the application launcher 246 launches the virtualized application 200 according to the execution policy in operation S140. For example, if the ID of a CPU in the system environment is '1234', and if the ID of a CPU pre-stored in the application software 210 is also '1234', the application launcher 246 of the environment monitor 240 may launch the virtualized application 200 according to the execution policy in operation S140.

Alternatively, if it is determined that the license for the system environment does not conform with the pre-stored license in operation S130-N (for example, if the ID of the CPU in the system environment is '1234' but if the ID of the CPU pre-stored in the application software 210 is '1111'), it is impossible for the application launcher 246 to launch the virtualized application 200. Therefore, the authentication process as described above prevents the virtualized application 200 from being freely copied without any limitations by various execution polices.

Figure 4:
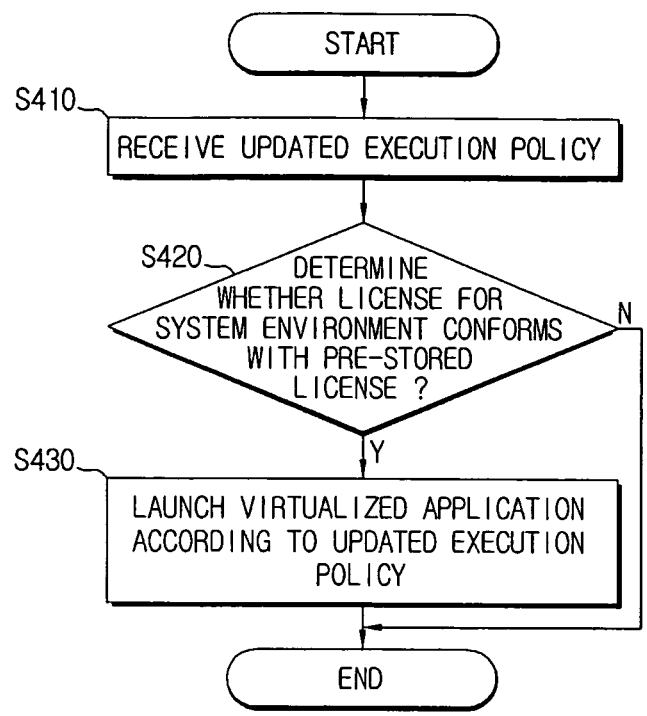
FIG. 4 illustrates a flowchart of a method of executing a virtualized application able to run in a virtualized environment according to another exemplary embodiment of the present invention.

FIG. 4 illustrates a flowchart of a method of executing a virtualized application able to run in a virtualized environment according to another exemplary embodiment of the present invention. The method shown in FIG. 4 includes receiving an updated execution policy (S410), determining whether a license for a system environment conforms with a license pre-stored in the virtualized application (S420), and launching the virtualized application according to the updated execution policy (S430) if it is determined that the license for the system environment conforms with the license pre-stored in the virtualized application (S420-Y). If it is determined that the license for the system environment does not conform with the license pre-stored in the virtualized application, then the method ends (S420-N).

Hereinafter, operation S410 will be described in detail with reference to FIGS. 5 to 7. Operations S420 and S430 may be performed in a similar manner as operations S130 and S140, so no further description thereof is herein provided. Operation S410 may also be performed in the same manner as operations S110 and S120 shown in FIG. 1.

Figure 5:
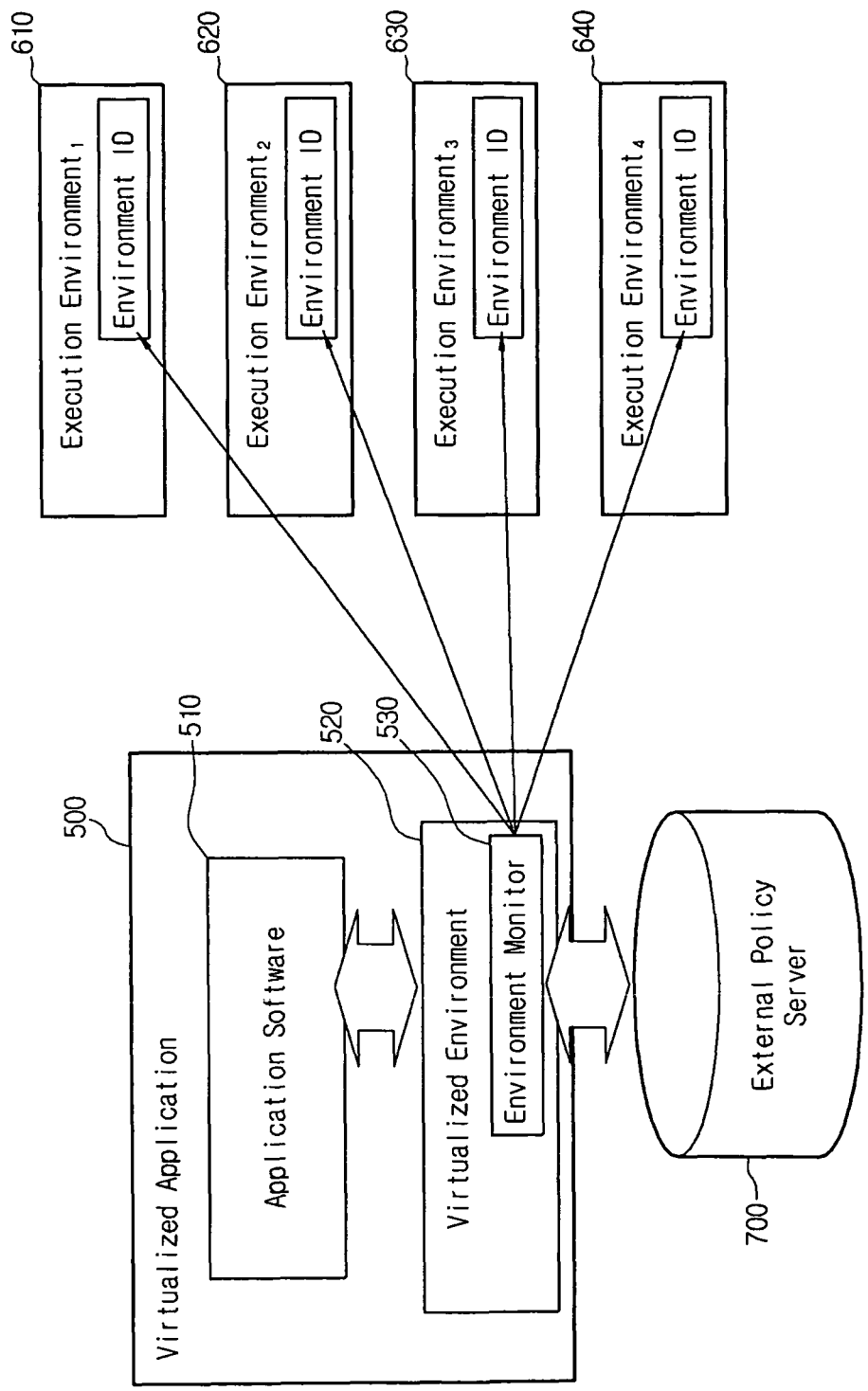
FIG. 5 illustrates a block diagram explaining the principle of operation of a virtualized application able to run in a virtualized environment.

FIG. 5 illustrates a block diagram explaining the principle of operation of a virtualized application 500 able to run in a virtualized environment 520. In FIG. 5, the virtualized application 500 includes application software 510 and the virtualized environment 520. The virtualized environment 520 includes an environment monitor 530. The virtualized environment 520 may be integrated with the environment monitor 530 and operate based on a plurality of external execution environments 610 to 640. When the virtualized application 500 is executed in the plurality of external execution environments 610 to 640, the environment monitor 530 determines whether the virtualized application 500 complies with the respective execution policies of each of the plurality of external execution environments 610 to 640. Each environment ID indicating each of the plurality of external execution environments 610 to 640 may be a license for the execution policy. Additionally, the execution policies of the plurality of external execution environments 610 to 640 may be updated by an external policy server 700.

Figure 6:
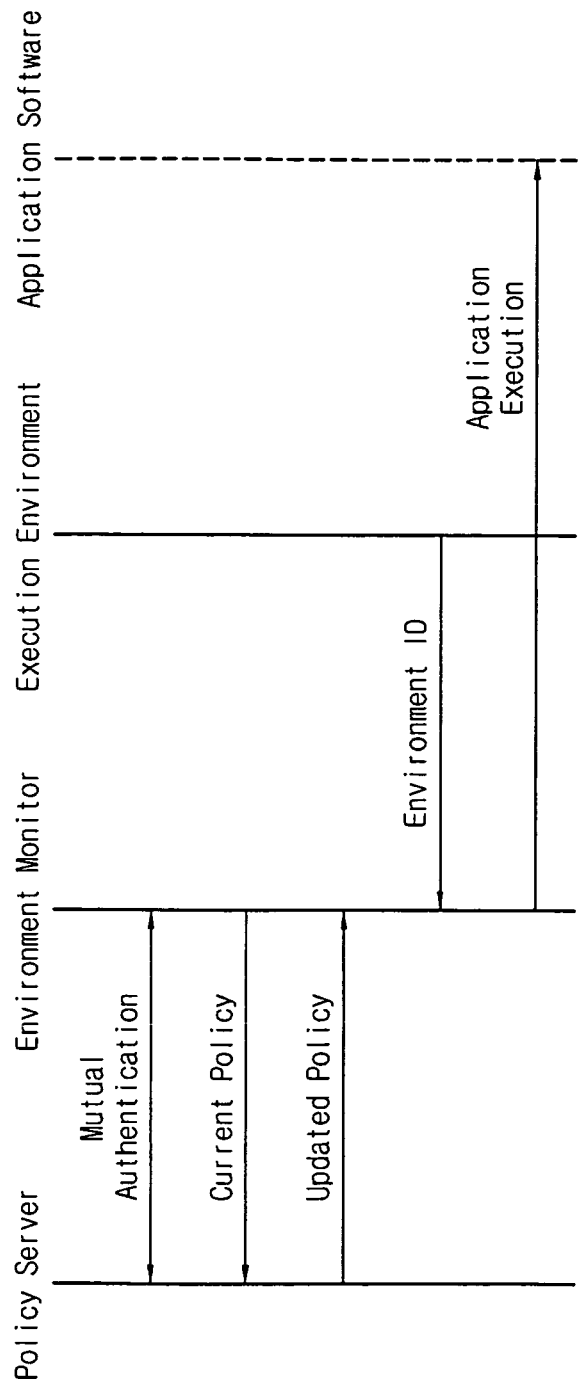
FIG. 6 illustrates an example of updating an execution policy.

FIG. 6 illustrates an example of updating an execution policy. In FIGS. 5 and 6, the external policy server 700 connected to a network (not shown) updates the execution policy. In more detail, mutual authentication is performed between the external policy server 700 and the environment monitor 530 of the virtualized environment 520. The current execution policy pre-stored in the environment monitor 530 is transmitted to the external policy server 700. The external policy server 700 receives the current execution policy and determines whether the received current execution policy is up-to-date. If it is determined that the received current execution policy is not up-to-date, the external policy server 700 updates the current execution policy and transmits the updated execution policy to the environment monitor 530.

The operations of the application software 510 respectively, with each of the plurality of external execution environments 610 to 640 have already been described with reference to FIGS. 1 and 5, so no further description thereof herein provided.

Figure 7:
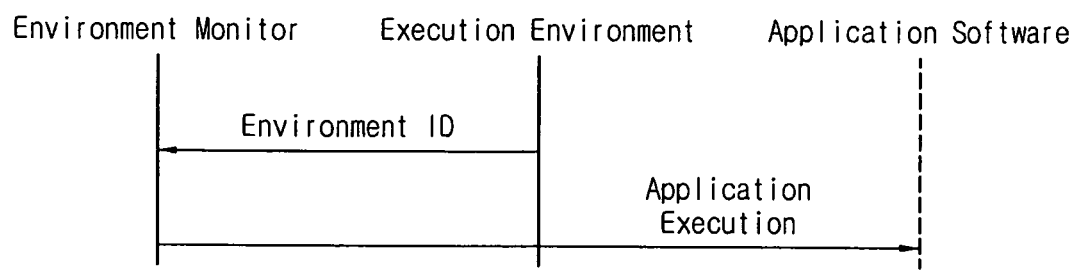
FIG. 7 illustrates another example of updating an execution policy.

FIG. 7 illustrates another example of updating an execution policy in a situation in which there is no external policy server 700 (FIG. 5) of FIG. 6. A process of updating the execution policy shown in FIG. 7 is performed in the same manner as that shown in FIGS. 5 and 6, except that here, the virtualized application 500 (FIG. 5) complies with the last updated execution policy among the execution policies pre-stored in the virtualized environment 520, so no further description thereof is herein provided.

The method of executing a virtualized application able to run in a virtualized environment, as described above, may be performed by a computer-readable recording medium containing a program to cause a computer to perform the method.

Aspects of embodiments of the present invention can be embodied as computer-readable codes on a computer-readable recording medium. The computer-readable recording medium is any data storage device that can store data which can be thereafter read by a computer system or computer code processing apparatus. Examples of the computer-readable recording medium include read-only memory (ROM), RAM, CD-ROMs, magnetic tapes, floppy disks, optical disks and optical data storage devices. Additionally, according to aspects of embodiments of the present invention, the computer-readable codes can be realized as data signals embodied in carrier waves.

As described above, according to aspects of embodiments of the present invention, it is possible to prevent software able to run in a virtualized environment from being freely copied without any limitations by the execution policy provided by a software provider.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of executing a virtualized application able to run in a virtualized environment, the method comprising:
    using a computer to perform the method of:
        searching for a license pre-stored in the virtualized application, upon an occurrence of an event to launch the virtualized application;
        monitoring a system environment having a central processing unit, the system environment being directly and externally connected to the virtualized environment;
        determining whether a license received from the system environment conforms with the pre-stored license by comparing the license received from the system environment with the license pre-stored in the virtualized application; and
        launching the virtualized application to run in the virtualized environment, according to an execution policy of the virtualized application, upon determining that the license received from the system environment conforms with the pre-stored license,
        wherein the determining of whether the license received from the system environment conforms with the pre-stored license is performed by an environment monitor included in the virtualized application in the virtualized environment.

2. The method as claimed in claim 1, wherein the determination of whether the license received from the system environment conforms with the pre-stored license is a precondition required to perform the execution policy of the virtualized application.

3. The method as claimed in claim 1, wherein the execution policy of the virtualized application is capable of being updated by an external server.

4. The method as claimed in claim 1, further comprising:
    installing the virtualized application.

5. The method as claimed in claim 1, wherein the virtualized environment comprises an environment in which conditions required for installing the virtualized application in the system environment are set virtually.

6. The method as claimed in claim 1, wherein each of the license received from the system environment and the pre-stored license are selected from a group comprising an identification (ID), an execution period, a number of times of execution, a type and version of operating system (OS), and an execution environment.

7. The method as claimed in claim 1, further comprising:
    searching for an execution policy and the license in the system environment;
    receiving environment identification information from the system environment which includes information on a license for the system environment;
    receiving an execution policy from the system environment;
    determining whether the virtualized application complies with the received execution policy from the system environment;
    wherein the environment monitor performs the determining of whether the virtualized application complies with the received execution policy.

8. A method of executing a virtualized application able to run in a virtualized environment, the method comprising:
    using a computer to perform the method of:
        receiving an updated execution policy;
        determining whether a license received from a system environment having a central processing unit conforms with a license pre-stored in the virtualized application, by comparing the license received from the system environment with the license pre-stored in the virtualized application; and launching the virtualized application to run in the virtualized environment, according to the updated execution policy, upon determining that the license received from the system environment conforms with the pre-stored license, wherein the determining of whether the license received from the system environment conforms with the pre-stored license is performed by an environment monitor which is included in the virtualized application in the virtualized environment, wherein the system environment is directly and externally connected to the virtualized environment.

9. The method as claimed in claim 8, wherein the receiving comprises:

transmitting one of a plurality of execution policies pre-stored in the virtualized environment to an external server;

determining whether the transmitted execution policy is up-to-date; and receiving the updated execution policy from the external server, when it is determined that the transmitted execution policy is not up-to-date.

10. The method as claimed in claim 8, wherein the receiving comprises receiving a last updated execution policy among a plurality of execution policies pre-stored in the virtualized environment.

11. A computer-readable recording medium having a program causing a computer to perform a method of executing a virtualized application able to run in a virtualized environment, wherein the method comprises:

searching for a license pre-stored in the virtualized application, upon an occurrence of an event to launch the virtualized application;

monitoring a system environment having a central processing unit, the system environment being directly and externally connected to the virtualized environment;

determining whether a license received from the system environment conforms with the pre-stored license by comparing the license received from the system environment with the license pre-stored in the virtualized application; and launching the virtualized application to run in the virtualized environment according to an execution policy of the virtualized application, upon determining that the license received from the system environment conforms with the pre-stored license, wherein the determining of whether the license received from the system environment conforms with the pre-stored license is performed by an environment monitor, which is included in the virtualized application in the virtualized environment.

12. The computer-readable recording medium as claimed in claim 11, wherein the determination of whether the license received from for the system environment conforms with the pre-stored license is a precondition required to perform the execution policy of the virtualized application.

13. The computer-readable recording medium as claimed in claim 11, wherein the method further comprises installing the virtualized application.

14. The computer-readable recording medium as claimed in claim 11, wherein the method further comprises:

searching for an execution policy and the license in the system environment;

receiving environment identification information from the system environment which includes information on a license for the system environment;

receiving an execution policy from the system environment;

determining whether the virtualized application complies with the received execution policy from the system environment;

wherein the environment monitor performs the determining of whether the virtualized application complies with the received execution policy.

15. A computer-readable recording medium having a program causing a computer to perform a method of executing a virtualized application able to run in a virtualized environment, wherein the method comprises:

receiving an updated execution policy;

determining whether a license received from a system environment having a central processing unit conforms with a license pre-stored in the virtualized application by comparing the license received from the system environment with the license pre-stored in the virtualized application; and launching the virtualized application to run in the virtualized environment, according to the updated execution policy, upon determining that the license received from the system environment conforms with the pre-stored license, wherein the determining of whether the license received from the system environment conforms with the pre-stored license is performed by an environment monitor, which is included in the virtualized application in the virtualized environment, wherein the system environment is directly and externally connected to the virtualized environment.

16. The computer-readable recording medium as claimed in claim 15, wherein the receiving comprises:

transmitting one of a plurality of execution policies pre-stored in the virtualized environment to an external server;

determining whether the transmitted execution policy is up-to-date; and receiving the updated execution policy from the external server, when it is determined that the transmitted execution policy is not up-to-date.

17. The computer-readable recording medium as claimed in claim 15, wherein the receiving comprises receiving a last updated execution policy among a plurality of execution policies pre-stored in the virtualized environment.

* * * * *

UNITED STATES PATENT AND TRADEMARK OFFICE
CERTIFICATE OF CORRECTION

| | | |
|---|---|---|
| PATENT NO. | : 8,474,005 B2 | Page 1 of 1 |
| APPLICATION NO. | : 12/318814 | |
| DATED | : June 25, 2013 | |
| INVENTOR(S) | : Jae-min Park et al. | |

It is certified that error appears in the above-identified patent and that said Letters Patent is hereby corrected as shown below:

In the Claims

In Column 9, Line 56, In Claim 12, delete "for the" and insert -- the --, therefor.

Signed and Sealed this
Eighteenth Day of February, 2014

Michelle K. Lee
*Deputy Director of the United States Patent and Trademark Office*